(12) United States Patent
Barbuto et al.

(10) Patent No.: US 6,308,739 B1
(45) Date of Patent: Oct. 30, 2001

(54) FLEXIBLE ROTOR VALVE SEAL AND GANGED ROTOR VALVE INCORPORATING SAME

(75) Inventors: David J. Barbuto, Laconia; Theodore T. Evangelo, Northfield; James B. Horman, Jr., Tilton, all of NH (US)

(73) Assignee: Quality Controls, Inc., Tilton, NH (US)

( * ) Notice: Subject to any disclaimer, the term of this patent is extended or adjusted under 35 U.S.C. 154(b) by 0 days.

(21) Appl. No.: 09/242,941
(22) PCT Filed: Feb. 13, 1998
(86) PCT No.: PCT/US98/02904
§ 371 Date: Feb. 26, 1999
§ 102(e) Date: Feb. 26, 1999
(87) PCT Pub. No.: WO99/41535
PCT Pub. Date: Aug. 19, 1999
(51) Int. Cl.[7] .............................. F16K 25/00; F16K 11/085
(52) U.S. Cl. .................. 137/625.19; 137/625.11; 137/625.47
(58) Field of Search ............... 137/625.11, 625.19, 137/625.43, 625.47; 251/181, 182, 301, 314, 316, 317, 317.01, 363

(56) References Cited

U.S. PATENT DOCUMENTS

| | | | |
|---|---|---|---|
| 2,154,945 | * | 4/1939 | Kyes ........................ 137/625.19 X |
| 2,371,657 | * | 3/1945 | Stark .................................. 251/182 |
| 2,821,998 | * | 2/1958 | Mayhew ........................ 137/625.11 |
| 2,840,109 | * | 6/1958 | Wadleigh ........................ 251/317 X |
| 3,908,697 | * | 9/1975 | Witzel ............................ 137/625.47 |
| 4,548,385 | * | 10/1985 | Barbuto .......................... 251/317 X |
| 4,697,786 | * | 10/1987 | Kennedy ........................ 251/317 X |
| 5,167,254 | * | 12/1992 | Walter et al. ............... 137/625.43 X |

* cited by examiner

Primary Examiner—John Rivell
(74) Attorney, Agent, or Firm—Devine, Millimet & Branch, P.A.; Paul C. Remus; Kristin Kohler

(57) ABSTRACT

The present seal (10) is a disc of a rigid but deformable plastic, the top surface of which is cylindrical, and the bottom of which has a circular groove (12) containing a flexible sealing mechanism (15). This seal is suited for use in a ganged rotor valve (22) having two or more levels of independent fluid passageways through the rotor along the length thereof. Each level will usually have two independent L-shaped passageways (34, 35). The seal (10) of this invention fits into the rotor about each of the ends of the passageways (34, 35) to seal the passageway between the rotor and the valve body (22).

7 Claims, 5 Drawing Sheets

FLEXIBLE ROTOR VALVE SEAL AND GANGED ROTOR VALVE INCORPORATING SAME

BACKGROUND OF THE INVENTION

The present invention is an improved flexible rotor valve seal and an improved ganged rotor valve utilizing the seal.

More particularly, this invention is an improvement of the seal disclosed in Flexible Seal for Rotor Valves, U.S. Pat. No. 4,548,385, Oct. 22, 1985, by one of the present inventors. The improved seal permits the manufacture of a novel ganged multiway rotor valve, e.g. an 8-way value.

The rotor valve seal of U.S. Pat. No. 4,548,385 works excellently in the usual applications for which it was designed. However, when the valve has an extended rotor and a multiplicity of ports, the seal of the patent provides such a large contact area that rotor movement is unduly stiff or impeded requiring undue force to turn the rotor or a larger drive motor than may be necessary. Also, because the plastic of the seal expands with heating, it is desirable to reduce the mass thereof as much as possible. In addition, the expansion of the seal material upon heating also leads to, or adds to, stiff or impeded rotor movement.

The seal of the patent is characterized by having a rectangular shape that fits or slides into a flat-bottomed channel in the valve rotor that lies about the port to be sealed. In a 4-way valve with the ports spaced 90 degrees about the rotor, 4 such seals would be used each having an opening registering with the ports of the rotor and valve body. The outer surface of the seal is curvilinear, mating with the curvature of the valve body. As is shown in the patent, the inner flat surface of the seal mates with the flat bottom of the channel in the rotor and has a circular groove about the port to be sealed which groove retains an O-ring. The rectangular shape of the seal works well, but with the particular design of the seal device, a better seal is achieved with increased internal pressure within the valve. While increased pressure provides for a better seal, it also leads to increasingly stiff action of the valve requiring increasing force to turn the rotor. In addition, the rectangular shape of the seal includes corners which can be collection points for particulate contaminants, also leading to an increase in the force or torque required to turn the rotor and operate the valve.

Thus it would be desirable to have a rotor valve seal and valve with reduced thermal expansion of the components within the valve, reduced potential collection points for contaminants, and a seal mechanism that does not require increased internal pressure to provide a tighter seal. It would be desirable to have a rotor valve seal and valve that would always be operable with low amounts of torque regardless of temperature, pressure within the valve and contaminants.

SUMMARY OF THE INVENTION

It has now been found that the seal can be just, if not more effective, if it is circular rather than rectangular. This reduces the surface area of the seal in contact with the valve body and thus the force required to turn the rotor. [The O-ring—the flexible sealing mechanism that energizes the seal—and its channel operate in the same manner as illustrated in the patent, except that the sealing force of the O-ring around the circumference of the port in the seal is more uniform, i.e. as the seal of the patent was rectangular, the force developed by the fluid pressure within the port against the inner, circular wedge was not uniformly distributed around the outer portions of the seal.] The sealing force of the O-ring around the circumference of the port in the seal of the present invention is more uniform than that of the prior art U.S. Pat. No. 4,548,385. Because the seal of the prior art patent was rectangular, the force developed by the fluid pressure against the inner, circular wedge was not uniformly distributed around the outer portions of the seal. The present design solves this problem using a seal that provides uniform pressure. Further, the present invention, that does not have corners avoids the buildup of contaminants as occurs with the rectangular design of the prior art. The buildup of contaminants can lead to binding of the valve, and at least increasing force required to turn the rotor. This buildup is avoided in the present invention.

In addition the prior art patent uses a deformable seal material which has a much greater coefficient of thermal expansion than that of the surrounding metal valve parts. This combined with the relatively large amount of the seal material used in the rectangular seal and the irregular shape of the seal results in the seal experiencing vastly varying amounts of thermal expansion within itself. This creates a thermal expansion problem that is difficult to control and can cause the valve to bind, and also can weaken the seal.

The design of the present invention reduces the contact area of the solid seal and that of the ported seal compared to the prior art patent to Barbuto. The reduced contact area results in decreased frictional seal resistance, decreased thermal expansion and therefore decreased effort required to operate the valve.

The seal of this invention is then a disc of a rigid but deformable plastic, e.g. a glass or carbon fiber reinforced plastic, preferably one offering a low coefficient of sliding friction, such as a polytetrafluoroethylene. This disc is preferable machined but in some instances can be compression molded.

The disc, if not used to seal off an entry or exit port, has a central, circular port and its front surface is a portion of a cylindrical surface that is blemish free and without nicks and scratches. The front surface matches the curve of the valve body. The back surface of the disc is usually flat and has a circular groove therein equidistant about the central port to accommodate a flexible sealing mechanism, e.g. an O-ring. The depth of the groove preferably does not exceed 90 percent of the overall thickness of the seal. While the back of the disc is usually flat, it can be convex or concave as the application may require.

The seal can have any diameter, e.g. from 0.5 to 100 inches, with 1 to 24 inches being common. The flexible sealing mechanism can be an O-ring or can be square in cross-section. Quad rings are particularly useful. The flexible sealing mechanism "energizes" the seal and is of a flexible elastomeric or deformable material such as Delrin or Teflon (trademarks of E.I. DuPont de Nemours & Co.), a polyvinyl chloride, a polysulfone, a polyolefin (polyethylene), vulcanized rubber or the like.

The impart a degree of toughness and resistance to damage and cold flow the plastic of the disc is preferably reinforced as with 15% to 35% glass or carbon fibers or brass or sintered steel powder or similar materials.

The improved ganged rotor valve of this invention permitted by the improved seal comprises a valve body having a cylindrical rotor chamber into which fits a rotor. The rotor has several independent flow passageways or bores therein. One passageway can go from one level to another but more usually will go directly through the rotor. The valve body has inlet and outlet ports that mate with the rotor passageways. While at a minimum there will be at least two sets of inlets and outlets in the valve body spaced along the length thereof, i.e. an upper and a lower set, there will usually be a pair at each level along the length of the valve body with mating passageways or bores there through in the rotor for each set. In the following description there are a pair at spaced upper and lower levels of the valve.

The valve seal of this invention is inset into a circular seat in the cylindrical surface of the rotor about the end of each of the openings of the bores or passageways. The port of the seal, if it has one, aligns with the corresponding openings. The outer surface of the cylindrical seal of the disc has about the same radius of curvature, preferable slightly less, than that of the cylindrical surface with which it is in sealing contact. The groove at the bottom of the seal holding the flexible sealing mechanism operates against the disc urging the cylindrical surface of the disc against the wall of the rotor chamber.

Of particular interest is a ganged rotor valve having two paired inlet and outlet ports with each pair thereof having two inlet and outlet ports equidistant around the rotor chamber and with the rotor having two bores independent of one another for and mating with each of said paired outlet ports whereby each of the paired inlet and outlet ports with their respective bores operate as an 8-way valve. This valve permits the control of two independent fluid flows, such as an air-conditioning fluid and domestic hot water.

The 8-way ganged rotor valve is particularly useful in an air conditioning/heating unit wherein the heating and cooling flows of the air conditioner fluid need to be reversed from time to time, This valve greatly simplifies and decreases the plumbing required besides reducing the manufacturing costs and the energy loss of the air conditioner's plumbing. The 8-way air conditioner valve may be operated by a motor, and the seal of this invention reduces the force required such that the motor can be smaller and thus less expensive.

For air conditioning service, the valve may operate at a relatively low pressure, e.g. 10 psi and temperature, e.g. 200 degrees Fahrenheit. The valve can be constructed of machined aluminum, although brass or stainless steel can be used. In some cases, machinable or malleable plastics can be used.

Thus, the valve of the present invention solves many of the problems inherent in and unavoidable with the design of the prior art, specifically the U.S. Pat. No. 4.548,385 to Barbuto and provides a more efficient valve that provides a good seal at low internal pressures, i.e. does not require increasing pressure to increase the effectiveness of the seal, and yet maintains relatively low torque required to operate the valve even at increasing pressures and with temperature variations.

BRIEF DESCRIPTION OF THE DRAWINGS

In the drawings.

Throughout the drawings the same parts have the same numbers.

DETAILED DESCRIPTION OF THE ILLUSTRATED EMBODIMENTS

Figure 1:
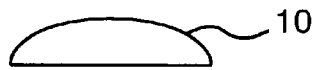
FIG. 1 is an elevational view of the improved seal of this invention without a port.
Figure 2:
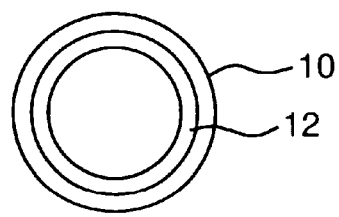
FIG. 2 is a bottom view.
Figure 4:
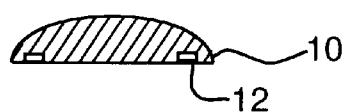
FIG. 4 is a half section elevational view of a disc without a central port.

Referring to FIGS. 1–4, the sealing disc of this invention is shown at 10. It has in one embodiment a central port 11 and the bottom has a groove 12 spaced about the central port which groove holds O-ring 15 as shown in the enlargement in FIG. 5 of the circled portion 14 of FIG. 3. The bottom of the disc is flat, and the top of the disc is a portion of a cylindrical surface that mates with the inner wall of the valve body. The views shown in FIGS. 1 and 4 are looking along the long axis of the cylindrical surface and that of FIG. 3 has a long axis parallel to the plane of the paper. As it has a cylindrical surface, the disc 10 fits into the valve in only one of two ways. In assembly, exact alignment is not required as the disc is self-aligning to some extent as the parts are pushed together.

FIG. 4 illustrates the seal without a central port when it is to be used to close off a passageway in a valve.

Figure 6:
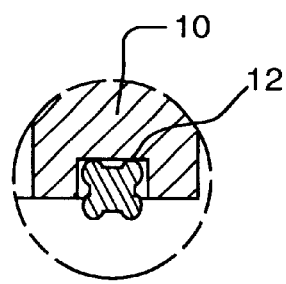
FIG. 6 is a similar view illustrating an alternative flexible sealing mechanism.

FIG. 6 illustrates another type of flexible sealing mechanism that can be used; namely, a quad ring.

Figure 7:
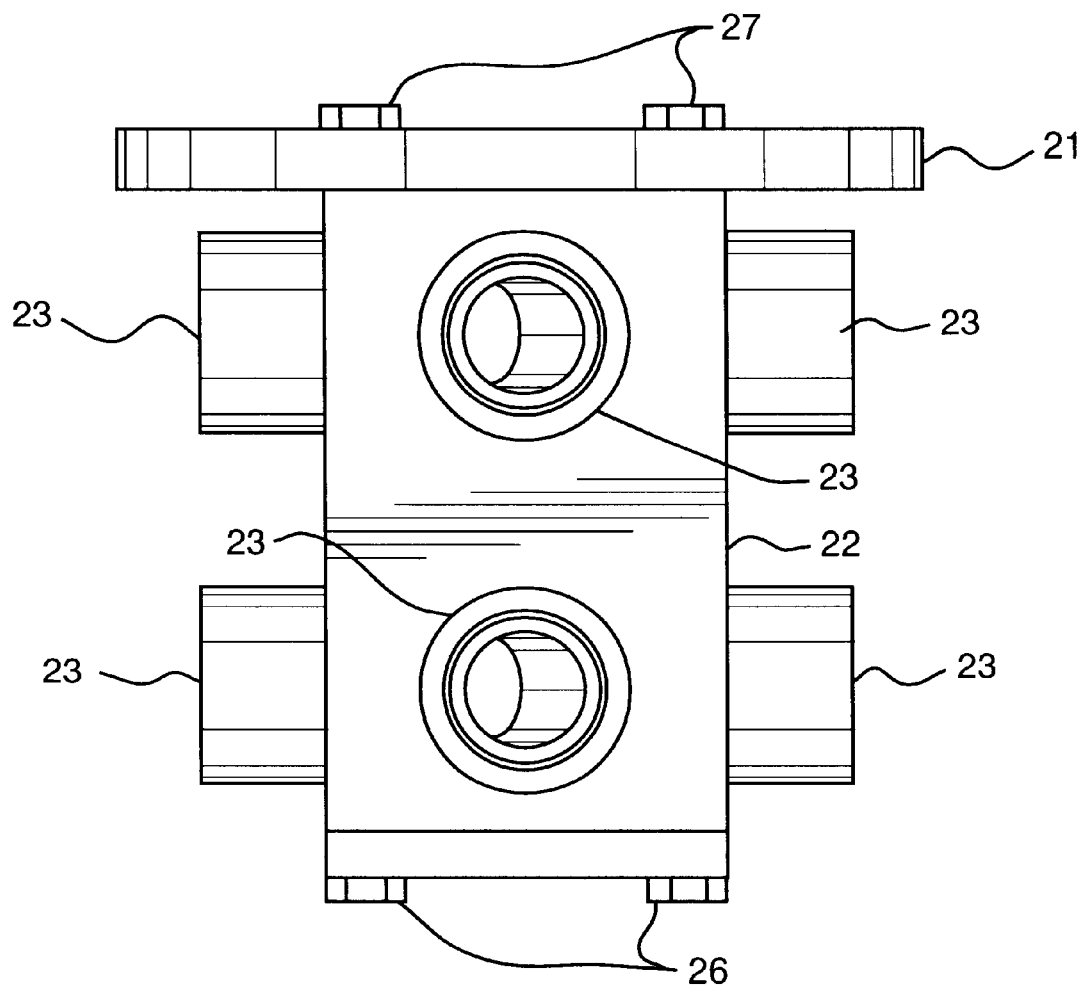
FIG. 7 is an elevational view of the 8-way valve of this invention.
Figure 8:
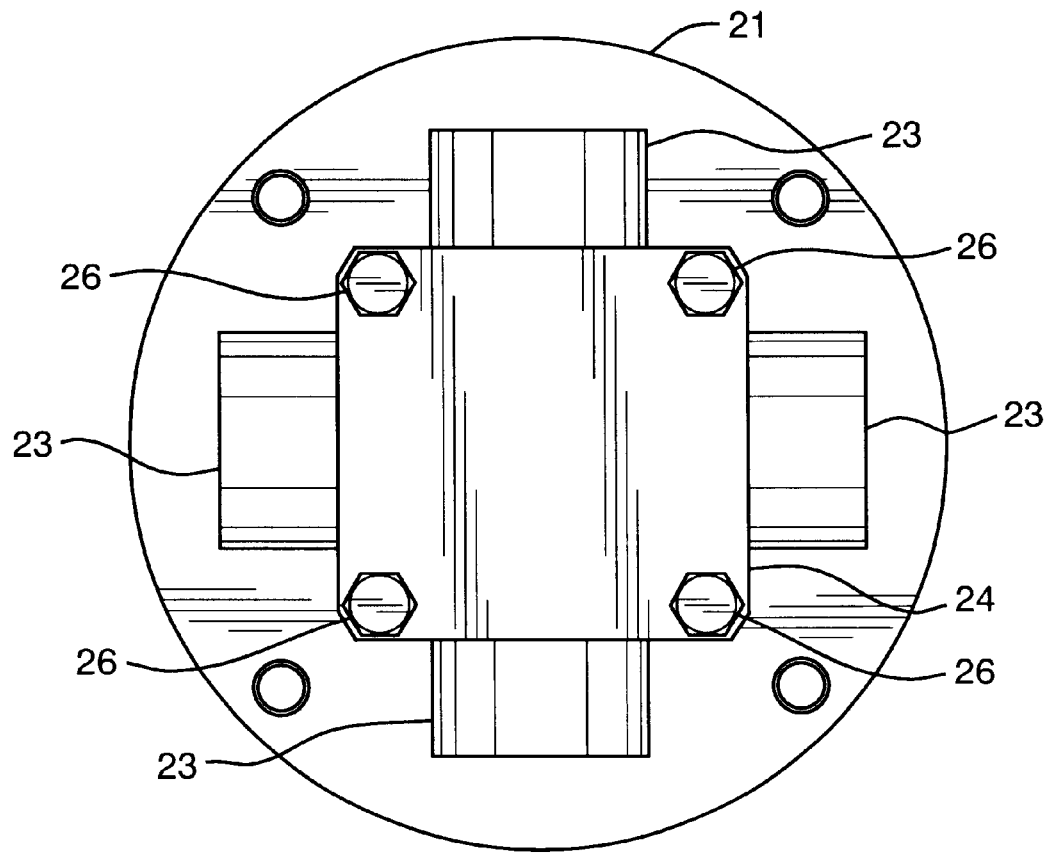
FIG. 8 is a bottom view of the above.

Referring to FIGS. 7 and 8, an 8-way valve is shown in elevation. A flange 21 to support a motor (not shown) is fastened to the valve by bolts 27.

The valve body 22 has two pairs of upper and lower inlets and outlets 23. The bottom of the valve body is closed by flange 24 held in place in bolts 26. While the valve is an 8-way valve, only one valve body is required.

Figure 9:
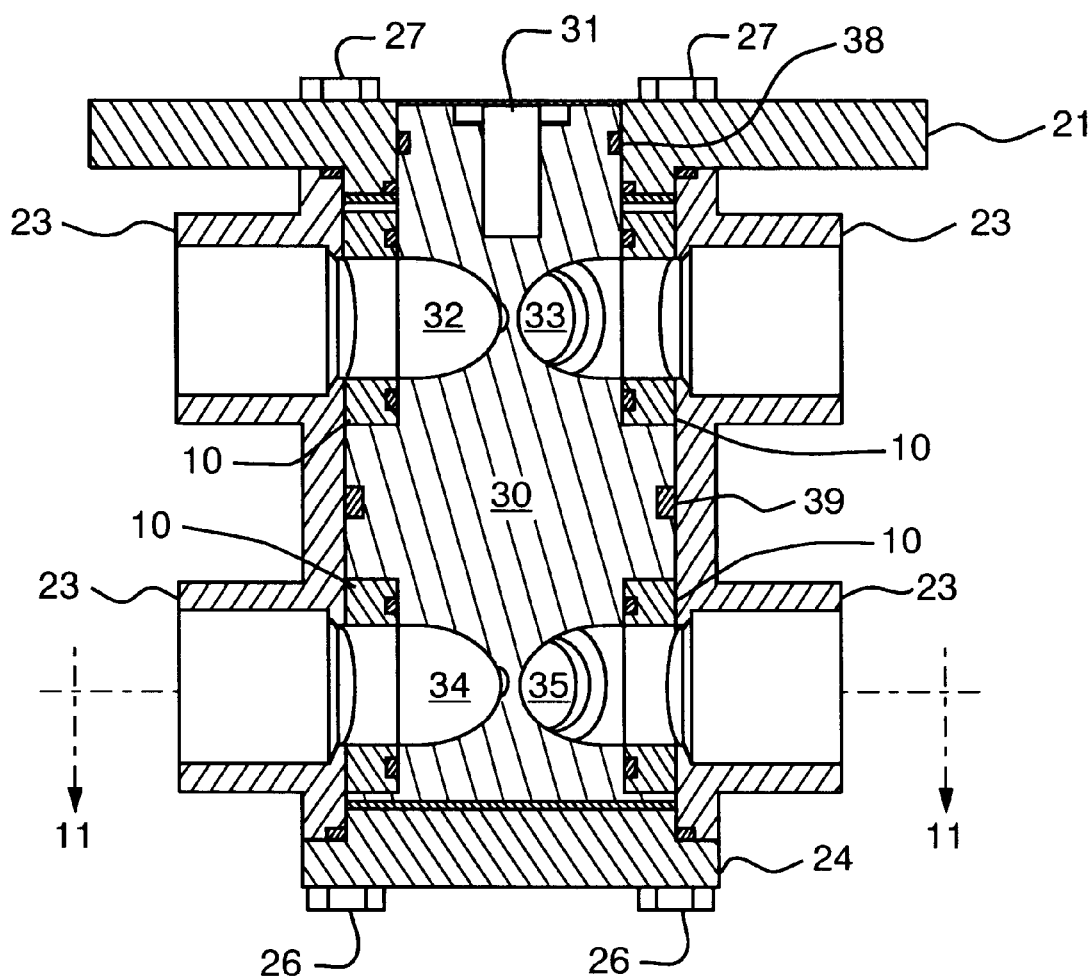
FIG. 9 is a half section elevational view of the valve.
Figure 10:
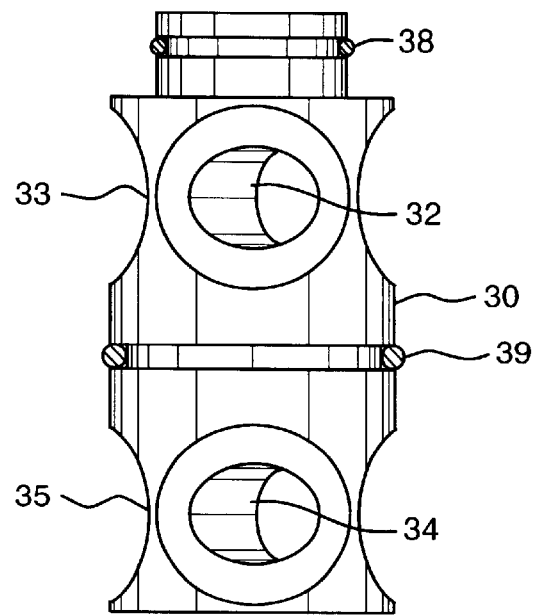
FIG. 10 is an elevational view of the rotor of the valve.
Figure 11:
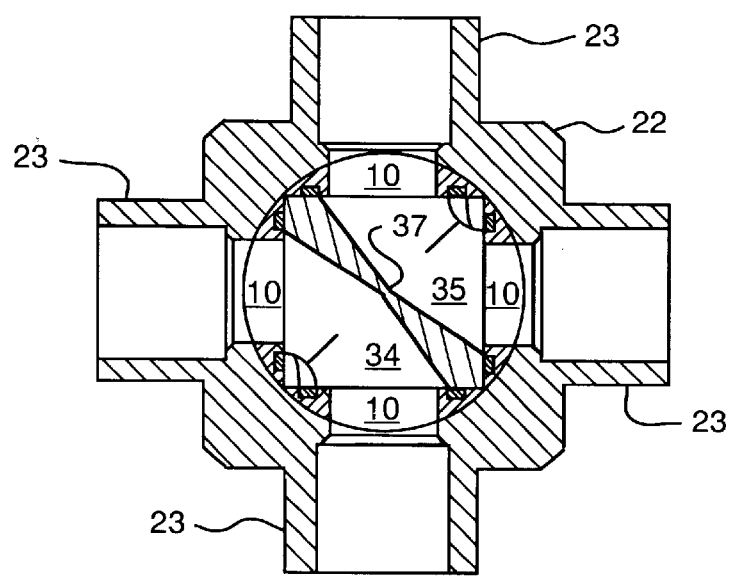
FIG. 11 is a sectional view of the valve taken along Line A—A of FIG. 9.

Turning to FIGS. 9, 10 and 11, the rotor 30 has at its top a recess 31 to receive the drive shaft of a motor (not shown). It has at its top a pair 32 and 33 of curved channels each connecting a pair of ports spaced 90 degrees from one another and similarly has a pair of channels 34 and 35 at its bottom portion. As with the valve body, while multiple ports in the rotor, only one rotor is required.

The upper end of the rotor has a seal at 38 as is known. The rotor also has a seal 39 such as an O-ring between the upper and lower passageways or channels 32, 33, 34 and 35 which serves to prevent flowage between the upper and lower channels during transition flow, i.e. when the rotor is being turned to another position.

As shown in FIG. 11, there is a relatively thin wall 37 that separates channels 34 and 35, and there is a similar division between channel 32 and 33.

In service it can be seen that in one position the rotor allows fluid to flow from one of the nipples 23 through, for example, the rotor channel 34 to the next adjacent nipple spaced 90 degrees therefrom while fluid from another nipple can flow through channel 35. By turning the rotor 90 degrees clockwise, the flow of the two fluids can be reversed. The ganged valve of this invention will work equally well with two-way and/or three-way flows at each level. Also, four-way flow patterns using straight through, L or T channels in the rotor at each level can be accomplished as is conventional. The single rotor helps ensure that all ports will be switched simultaneously when the flow of the fluids is reserved.

Figure 5:
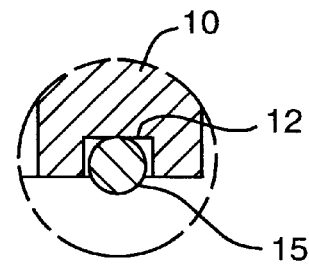
FIG. 5 is an enlarged view of the channel holding the sealing mechanism as circled in FIG. 3.
Figure 3:
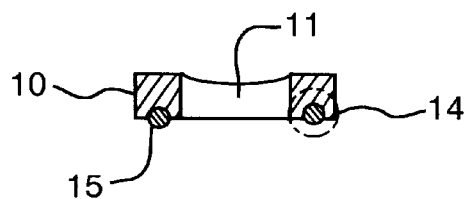
FIG. 3 is a half section elevational view of a disc having a central port.

The action of the O-ring in channel 12 is the same as described in U.S. Pat. No. 4,548,385 except as noted previously the force generated is more uniform about the disc, as the disc is round rather than rectangular. The flexible sealing mechanism can have a shape other than round in cross-section, and its groove can be rectangular in cross-section as shown in FIG. 5 or round as shown in U.S. Pat. No. 4,548,385 and tightly configured as may be required in food processing applications to avoid contaminants from getting between the groove and the ring.

POLYTETRAFLUOROETHYLENE

As an example, a disc seal of this invention is made of machined glass-fiber reinforced polytetrafluoro-ethylene. It has an outside diameter (O.D.) of 0.984 inches, a flat bottom and a crown with a radius of curvature of 0.750 inches. It has a central port there through of 0.563 inches diameter. About the port is an O-ring channel having an O.D. of 0.847 inches, an inner diameter of 0.762 inches and a depth of 0.049 inches.

What is claimed is:

1. An improved rotor valve seal comprising a disc of a rigid but deformable material having a top surface, a bottom surface, and a circumferential edge that seats in a circular receiving seat in a cylindrical outer surface of a rotor, said top surface thereof being a portion of a cylindrical surface and said bottom surface thereof having a circular groove therein equidistant from said circumferential edge, and a flexible sealing mechanism within said groove, wherein the combination of said disc and said circular groove with said flexible sealing mechanism therein comprise the sole means for urging said cylindrical surface of said disc into sliding but fluid tight engagement with the wall of a rotor chamber of a rotor valve to seal against leakage about said rotor valve seal.

2. The improved rotor valve seal of claim 1 wherein said disc is machined and has a central port within and spaced from said circular groove.

3. An improved ganged rotor valve comprising:
A.) one valve body having a cylindrical rotor chamber and having at least two sets of inlet and outlet ports spaced along the length of thereof, each set begin independent of the others;
B.) one rotor in said cylindrical rotor chamber in close engagement therewith and at least one bor there through for each of said paired inlet and outlet ports, and when in an aligned position mating therewith, and
C.) the rotor valve seal of claim 1 inset into a seat in the cylindrical surface of said rotor about the end of each of the openings of said bores therein, said cylindrical surfaces thereof having about the same radius of curvature as that of said cylindrical rotor chamber, and said flexible sealing mechanism urging said cylindrical surface of said disc into sliding, fluid tight engagement with the wall of said cylindrical rotor chamber.

4. The improved ganged rotor valve of claim 3 wherein at least two of said discs each have a central port aligning with the opening of the bore with which it is associated.

5. The improved ganged rotary valve of claim 3 wherein:
A.) there are two of said sets of inlet and outlet ports with each set thereof having two paired inlet and outlet ports radially equidistantly spaced around said cylindrical rotor chamber;
B.) there are two of said bores independent of one another in said rotor for and mating with each of said paired inlet and outlet ports, and
C.) whereby each of said rotor valves have a central port within said groove aligning with the opening of the bore with which it is associated, and
D.) whereby each of said paired inlet and outlet ports with their respective bores operate as four-way valves.

6. The improved rotor valve seal of claim 1 wherein said bottom surface is flat.

7. The improved rotor valve seal of claim 1 wherein the diameter of said disc is in the range of about ½ to about 100 inches.

* * * * *